United States Patent [19]

Birk et al.

[11] 4,266,905

[45] May 12, 1981

[54] APPARATUS FOR ACQUIRING WORKPIECES FROM A STORAGE BIN OR THE LIKE

[75] Inventors: John R. Birk, Peace Dale; Robert B. Kelley, Kingston; Richard P. Tella, Ashaway, all of R.I.

[73] Assignee: Board of Regents for Education of the State of Rhode Island, Providence, R.I.

[21] Appl. No.: 32,239

[22] Filed: Apr. 20, 1979

[51] Int. Cl.³ ............................................ B65G 47/00
[52] U.S. Cl. .................................. 414/627; 414/416; 294/64 R; 221/211
[58] Field of Search ................... 414/416, 627, 744 B; 294/64 R; 209/643; 221/211

[56] References Cited

U.S. PATENT DOCUMENTS

| 2,695,190 | 11/1954 | Meierjohan | 294/90 |
| 3,085,713 | 4/1963 | Reiners | 414/737 X |
| 3,970,201 | 7/1976 | Keene | 294/64 R X |

FOREIGN PATENT DOCUMENTS 2370660  6/1978  France .................................. 414/737

OTHER PUBLICATIONS

Differential Vacuum Sensing, M. K. Avedissiain, *Western Electric Technical Digest*, No. 40, Oct. 1975, pp. 3 and 4.

*Primary Examiner*—Allen N. Knowles
*Attorney, Agent, or Firm*—Thompson, Birch, Gauthier & Samuels

[57] ABSTRACT

Apparatus for acquiring individual workpieces from a supply of randomly oriented workpieces in a storage bin or the like. The apparatus includes a movably mounted head assembly having a gripper connected thereto by an intermediate flexible support. A sensor generates a control signal responsive to a contact force exerted by the gripper on a workpiece. The gripper operates to grip the workpiece contacted thereby. The flexible support is then retracted to lock the gripper against an abutment surface fixed relative to the head assembly. Operation of the gripper and/or movement of the head assembly may be controlled in response to said control signal.

12 Claims, 13 Drawing Figures

APPARATUS FOR ACQUIRING WORKPIECES FROM A STORAGE BIN OR THE LIKE

BACKGROUND OF THE INVENTION

This invention relates to an apparatus for acquiring individual workpieces from a storage bin or the like containing a plurality of randomly oriented workpieces.

There are a wide variety of assembly line operations involving the handling and processing of individual workpieces. In such operations, attempts have been made at implementing automated workpiece handling systems which involve as a necessary initial step the acquisition of individual workpieces from a supply bin. Because the workpieces are usually randomly oriented in the bin, each acquired workpiece must be viewed and properly oriented before it can be subsequently processed. Viewing is normally accomplished by a video camera which generates a video signal representative of the actual orientation of the acquired workpiece. If necessary, appropriate corrections are made to the orientation of the acquired workpiece before further processing.

The known automated workpiece handling systems have generally failed to gain commercial acceptance because of their inability to acquire randomly oriented workpieces in a reliable and consistent manner.

For example, it has been proposed to utilize a gripper supported by a flexible connection, so that the gripper can conform to a randomly oriented workpiece. However, the problem with this arrangement is that after having been elevated from the work bin, subsequent accurate orientation of the workpiece is either very difficult or impossible due to the flexibility of the connection. Moreover, because these arrangements lack the ability to sense initial contact of the flexibly connected gripper with the workpiece, lost motion is often entailed, in addition to the possibility of having a damaging collision between the gripper and/or flexible arm and the workpieces.

It has also been proposed to mount the gripper on a rigid support which can be adjusted in only a single direction. A major problem associated with such an arrangement, an example of which is disclosed in U.S. Pat. No. 3,804,270, is that the surface angles of the randomly oriented workpieces vary widely relative to the direction of movement of the gripper. Since the gripper is connected to a relatively rigid support, its freedom of movement is restricted and oftentimes is insufficient to allow the workpiece to be adequately gripped for removal from the bin. This condition, of course, is unacceptable in a commerical context.

It is an object of the present invention to provide an apparatus capable of reliably and consistently acquiring single workpieces from a bin or the like containing randomly oriented workpieces.

Another object of the present invention is the provision of an apparatus employing a flexibly supported gripper to acquire randomly oriented workpieces. A sensor generates a control signal in response to a contact force exerted by the gripper on a workpiece. This control signal may be employed to activate the gripper and/or to control movement of the apparatus into and out of the storage bin.

A further object of the present invention is the provision of an apparatus which is capable of locating each acquired workpiece in a locked position at which its orientation can be determined automatically. Additional objects and advantages of the present invention will become evident in view of the following detailed discussion.

BRIEF DESCRIPTION OF THE DRAWINGS

FIG. 5 is a perspective view, with portions broken away, of the head assembly.

DESCRIPTION OF PREFERRED EMBODIMENT

Figure 1:
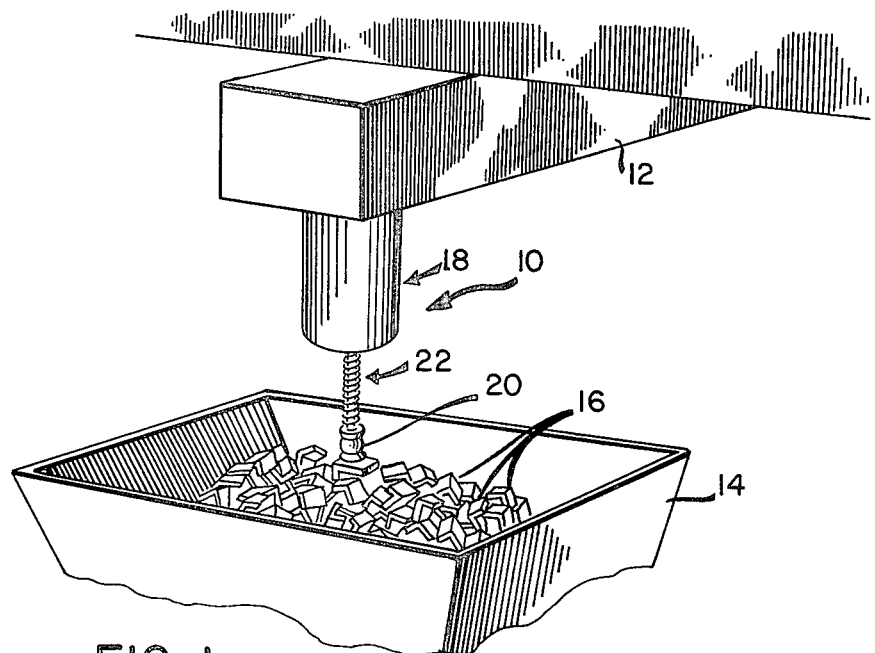
FIG. 1 is a perspective view of an apparatus embodying the concepts of the present invention.

Referring initially to FIG. 1, there is shown at 10 a gripping apparatus in accordance with the present invention. The apparatus is mounted in a depending fashion from a movable element 12, which for descriptive purposes will be considered as comprising the arm of a remotely controlled robot. The gripping apparatus is shown in an operative position overlying a storage bin 14 containing a supply of randomly oriented workpieces 16.

Referring additionally to FIGS. 2 and 5 to 7, it will be seen that the gripping apparatus 10 is comprised basically of a head assembly 18, and gripping means 20 flexibly connected to the head assembly by intermediate support means 22.

The head assembly 18 consists of a cylinder 24 cooperating with top and bottom plates 26, 28 to define a cylinder chamber 30 containing a reciprocal piston 32. The head assembly may be attached to the robot arm 12 by an convenient means, such as for example a centrally located tapped hole 34 in the top plate 26.

The piston 32 has a wall 36 radially spaced from and surrounding a central boss having a central passageway 40 extending axially therethrough. Passageway 40 is closed at the top by a plug 42 electrically insulated from the piston by means of a dielectric sleeve 44. The plug 42 is centrally drilled and tapped to receive an electrically conductive screw 46. The bottom of passageway 40 is closed by a plate 48. Passageway 40 contains a second reciprocal piston 50 provided with a conical electrically conductive contact nose 52 underlying and coaxially aligned with the bottom end of the contact screw 46.

The gripping means 20 includes a flexible suction cup 54 having an upstanding tubular boss 56 tightly received in a passageway 58 in a gripper body 60. The gripper body has an interior chamber 62 which is in communication with passageway 58 by means of a plurality of angled holes 59, and which is closed at the top by a gripper cap 64. The cap 64 has a top shoulder 66 surrounding an upstanding truncated conical nose 68. Nose 68 has a central enlarged passageway 70 leading to a reduced diameter passageway 72 which is in turn in communication with the chamber 62 in gripper body 60. The cap 64 may be secured to the body 60 by any convenient means, for example machine screws 74.

The support means 22 which connects the gripping means 20 to the head assembly 18 includes a flexible wire 76. The lower end of wire 76 extends through passageways 70, 72 and chamber 62 into a central hole in gripper body 60 where it is fixed by a set screw 78. The upper end of wire 76 extends through an opening 80 in the bottom cylinder plate 28 and a coaxial opening 82 in plate 48, and into a central passageway 84 in piston 50 where it is fixed to the piston by a set screw 86. Wire 76 is surrounded by a flexible tube 88 having its bottom end tightly received in the passageway 70 of gripper cap 64, and having its top end tightly received in the central passageway 84 of piston 50. The wire 76 and tube 88 are resiliently reinforced by an external coiled spring 90.

The opening 80 in the bottom cylinder plate 28 is surrounded by an annular neoprene disc 92 which is fixed relative to the head assembly and which provides an abutment surface for the top shoulder 66 of the gripper cap 64, as will hereinafter be explained more fully.

A tapped port 94 is provided in the top cylinder plate 26. Port 94 communicates with a passageway 96 in cylinder 24 and an angled passageway 98 in cylinder bottom plate 28. Passageway 98 leads to a blind hole 100 which receives the bottom end of a tube 102 extending vertically into chamber 30 between the piston wall 36 and central tubular boss 38 when the piston is in its lowermost position as shown for examples in FIGS. 2 and 5. The upper end of tube 102 is connected to one end of a flexible tube 104 which curves around the boss 38, with its other end being connected to a tube 106. Tube 106 extends through a vertically elongated opening 108 in boss 38 and is tightly received in an opening in piston 50, thus placing the tube 106 in communication with passageway 84. As previously described, passageway 84 communicates with the interior of suction cup 54 via tube 88, passageways 70, 72, chamber 62, holes 59, passageway 58 and tubular boss 56.

Another tapped port 110 is provided in the cylinder top plate 26. Port 110 communicates with one or more appropriately positioned suction cups 112 depending from the top plate 26 into the chamber 30.

Figure 8:
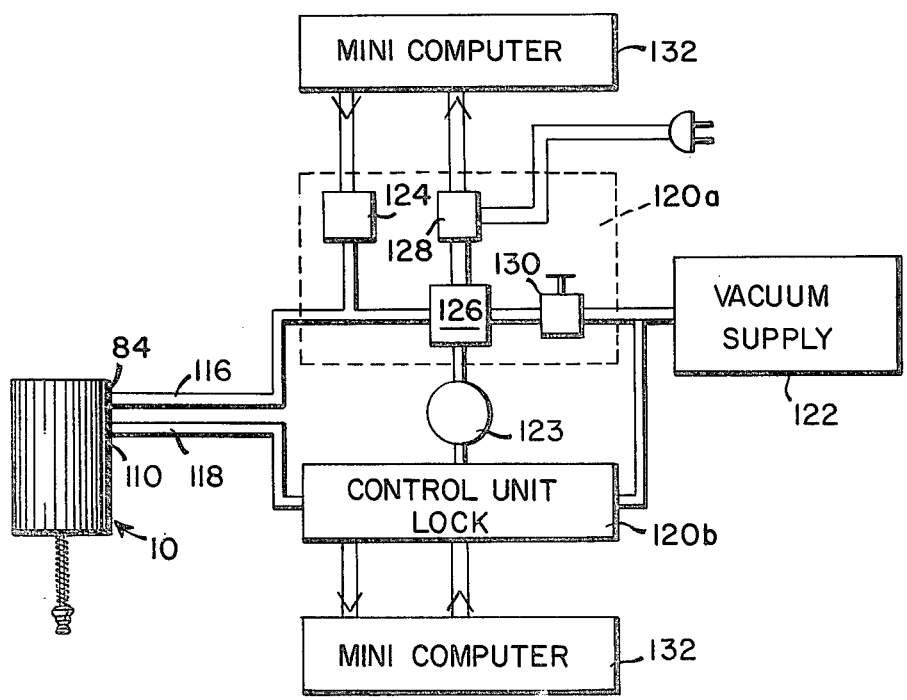
FIG. 8 is a schematic illustration of the control system.

Referring now to FIG. 8, it will be seen that ports 94, 110 are connected respectively to flexible vacuum hoses 116, 118 leading to two identical vacuum control units 120a, 120b. Each control unit is connected to a regulated vacuum supply 122 and to atmospheric relief at 123. Each control unit includes a vacuum switch 124, a three-way electrically controlled solenoid valve 126, a solid state relay 128, and a restricter valve 130. The vacuum switches 124 and relays 128 are connected to a robot system's mini-computer 132.

Each solenoid valve 126 operates in two states and forms the heart of its respective vacuum control unit 120. In the first state, energized, the valve 126 furnishes a direct path via the restricter valve 130 from the vacuum source 122 to the mechanism under control. In the second state, unenergized, the valve 126 seals the vacuum input, and provides a vacuum relief path from the atmosphere to the mechanism under control. Each solenoid valve 126 is actuated from the solid state relay 128 which is ultimately controlled by voltage levels from the robot system's mini-computer 132.

The adjustable restricter valve 130 allows regulation of vacuum airflow in order to determine the operating speed of the mechanism under control. The vacuum switch 124 senses the state of the mechanism under control by monitoring the presence and absence of vacuum in the control lines. This state information is channeled to the robot system's mini-computer 132 by voltage levels.

Figure 2:
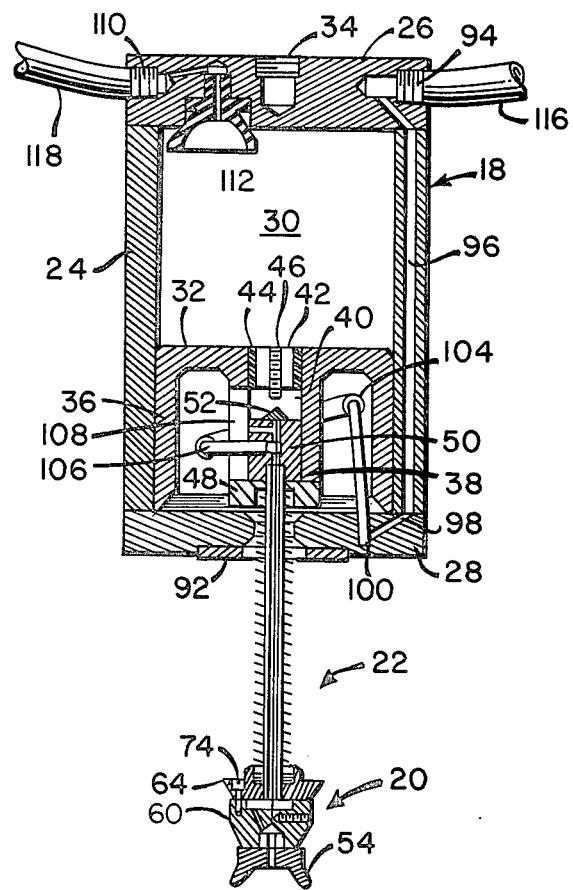
FIG. 2 is a vertical sectional view taken through the head assembly of the apparatus shown in FIG. 1.
Figure 3A:
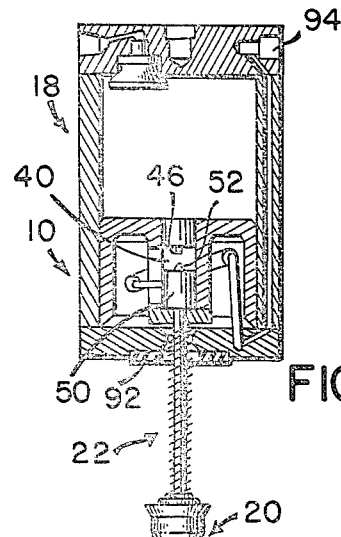
FIGS. 3A-3C are schematic illustrations depicting a typical sequential operation of the invention.
Figure 3B:
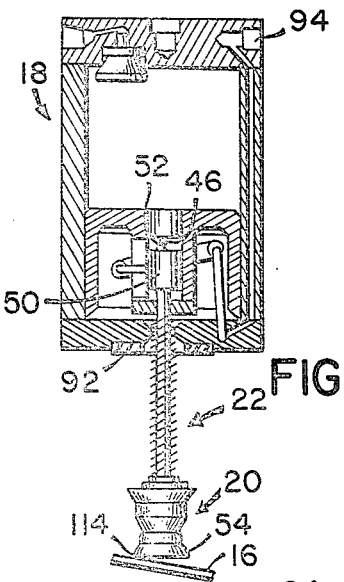
Figure 3C:
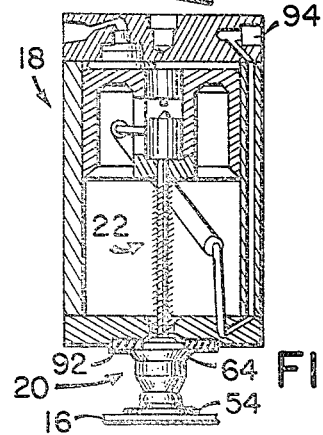
Figure 4A:
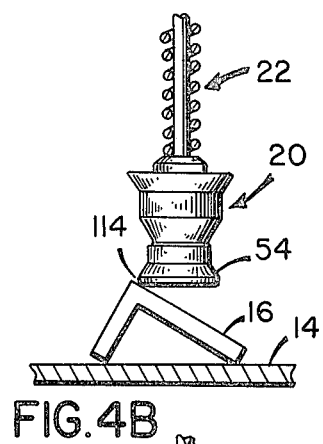
FIGS. 4A-4D are schematic illustrations depicting a typical sequential operation of the gripper means of the present invention.
Figure 4B:
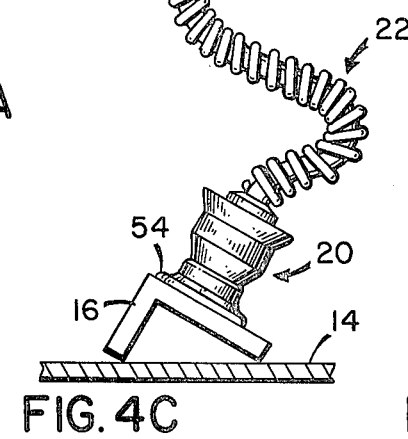

The operation of the apparatus will now be described with further reference to FIGS. 3A-3C and 4A-4D. The apparatus 10 is first positioned over the storage bin 14 as shown in FIG. 1, with the gripper 20 vertically spaced above a randomly oriented workpiece 16 as shown in FIG. 4A. At this stage, the components of the apparatus are arranged in a search mode as shown in FIGS. 2 and 3A. The electrical contacts 46, 52 are separated due to the fact that the piston 50 is at the bottom of the passageway 40 in the central boss 38 of piston 32. The electrical contacts 46, 52 are connected by means (not shown) to the mini-computer 132.

The robot arm 12 is next lowered gradually to bring the gripping means 20 into initial contact with the underlying workpiece 16. Initial contact is shown at 114 in FIGS. 3B and 4B. As soon as this initial contact occurs, and as the robot arm 12 continues its gradual descent, a contact force is transmitted from the gripping means 20 via the connecting means 22 to the piston 50. The piston 50 is elevated in passageway 40 by this contact force until nose 52 engages screw 46 (see FIG. 3B), thereby closing an electrical circuit and generating a control signal fed to the mini-computer 132. The mini-computer 132 operates in response to this control signal to energize the solenoid valve 126 of control unit 120a. The vacuum applied to port 94 is conducted through the network of communicating passages and tubes previously described to the suction cup 54 supported at the bottom end of the support means 22.

Figure 4C:
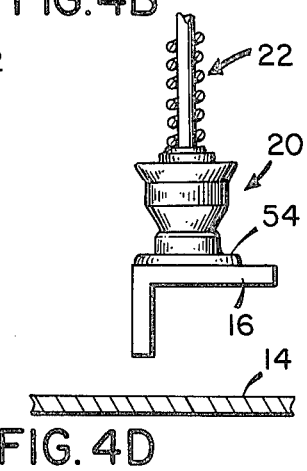
Figure 4D:
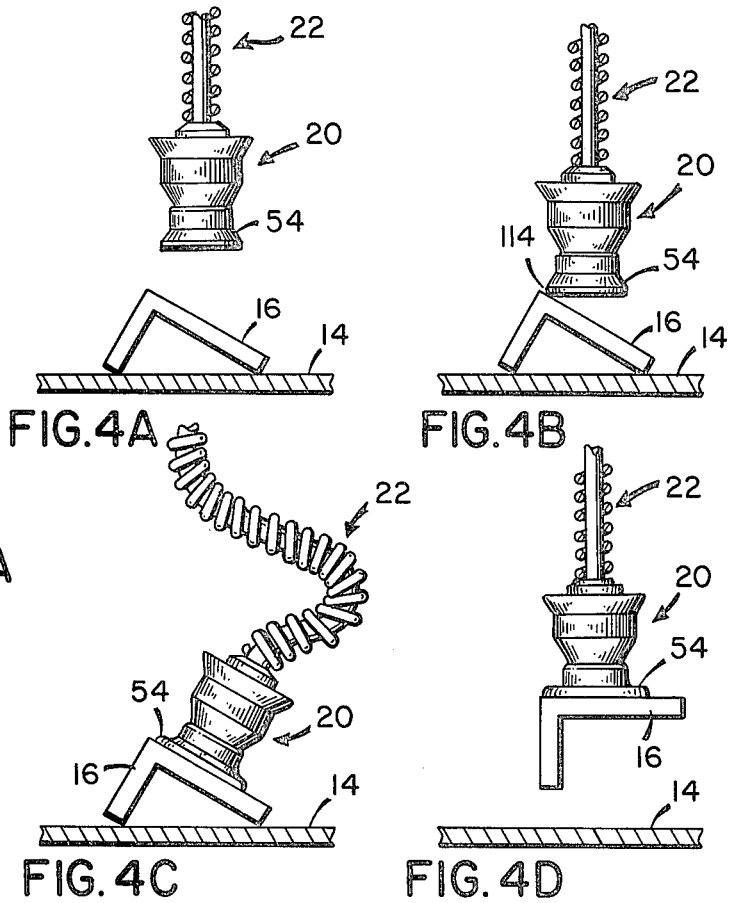
Figure 6:
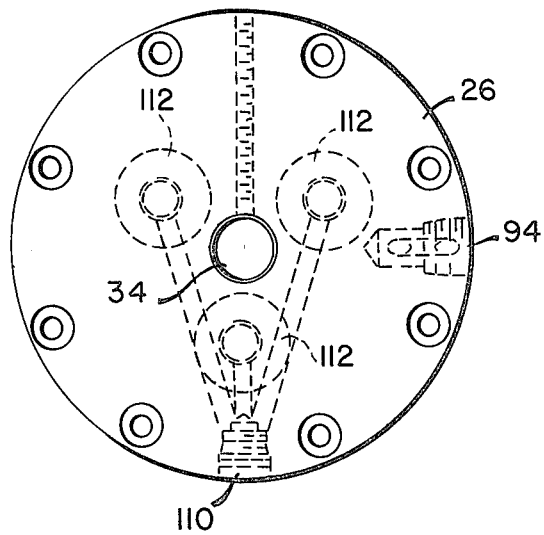
FIG. 6 is a top plan view of the head assembly.
Figure 7:
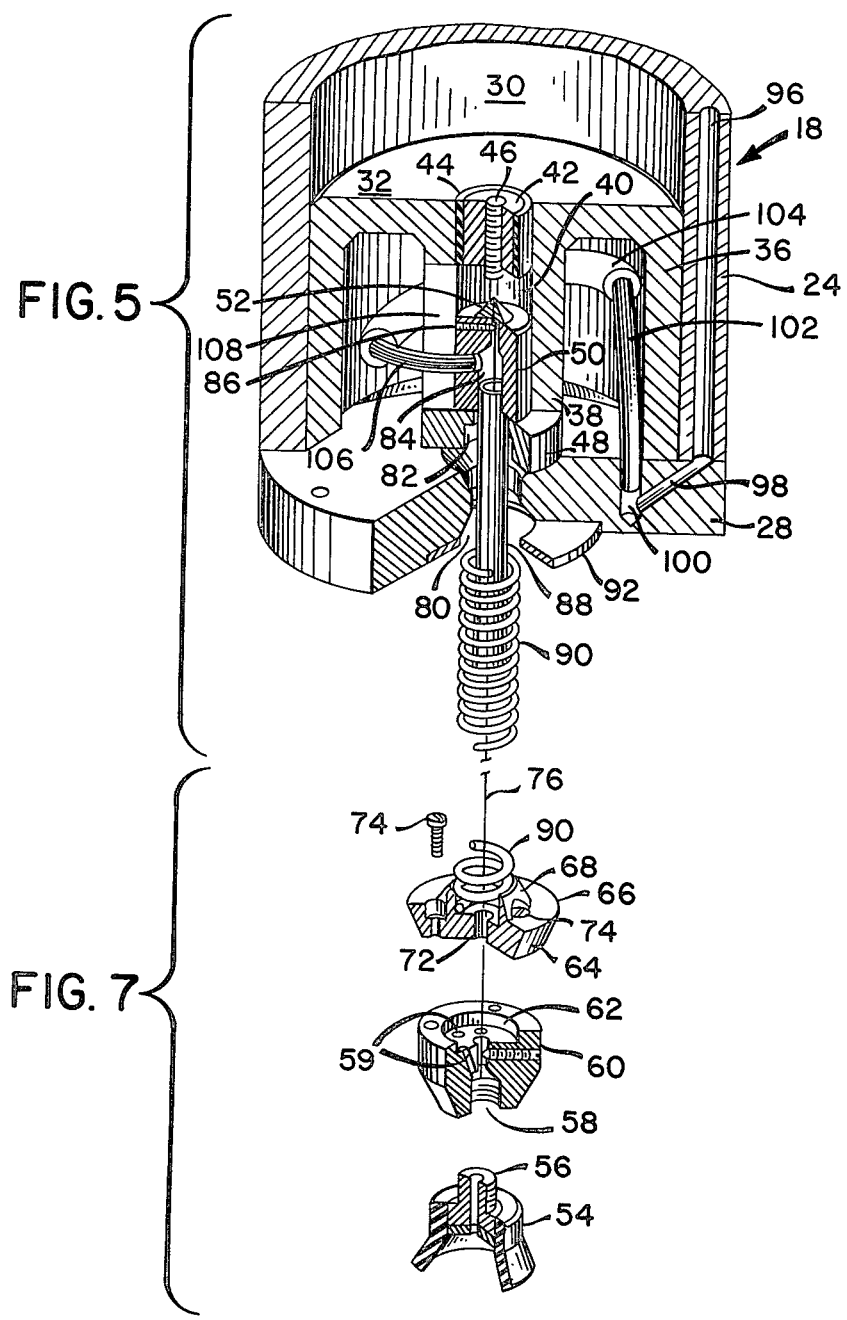
FIG. 7 is an exploded perspective view of the gripper means.

As the robot arm 12 continues its gradual descent, the combined flexibility of wire 76, tube 88 and spring 90 permits the gripping means 20 to movably adjust to the randomly oriented underlying workpiece 16, as shown for example in FIG. 4C. As this adjustment takes place, the vacuum cup 54 will develop a tight seal with and thus positively grip the surface it is in contact with. This in turn will reduce the air flow through port 94. This reduction in air flow will be sensed by the vacuum switch 124 of control unit 120a, and a signal will be fed to the mini-computer 132 which will activate to reverse the motion of arm 12. When this occurs, the workpiece 16 which is now positively gripped or "acquired" by the suction of cup 54 will be removed vertically from the storage bin 14 as shown for example in FIG. 4D. If an appropriate signal indicating positive acquisition is not timely received, the mini-computer will immediately reverse the downward movement of arm 12, and another try will be made. This of course avoids lost motion and prevents damaging collisions.

When the workpiece 16 has been elevated a sufficient distance from the bottom of the storage bin 14, the solenoid valve of control unit 120b is energized, and vacuum is applied to port 110 to exhaust the chamber 30 above piston 32. This causes the piston to rise within chamber 30 until it is in contact with and suctionally engated by the suction cups 112. By using suction cups 112, the necessity to maintain a vacuum in the entire chamber 30 is obviated during the time required to maintain the piston in its elevated position. At this point, as shown in FIG. 3C, the apparatus is in a locked mode, with the top shoulder 66 of the gripper cap 64 in engagement with the abutment surface defined by the annular disc 92 secured to the bottom of cylinder plate 28. This engagement of shoulder 66 with disc 92 fixes the position of the gripping means 20 and the acquired workpiece 12 relative to the head assembly 18. Thus, with the acquired workpiece in a known position relative to the head assembly, its orientation may be optically sensed and appropriate information generated for use in controlling further operations.

The robot arm 12 may then be traversed to an alternate disposal location where the acquired workpiece 16 may be released by de-energixing the solenoid valves 126 of both control units 120a, 120b in order to bleed atmospheric air to ports 94 and 110. In order to decrease the time required to lower the piston 32 in chamber 30, port 110 may be fed with compressed air.

The control signal generated by closing electrical contacts 46, 52 can also be used by the mini-computer 132 to determine the limit of descent of the apparatus into the bin before a damaging collision results.

Having thus described a preferred embodiment of the invention, it will now be appreciated by those skilled in the art that various changes and modifications may be made without departing from the spirit and scope of the invention. For example, the suction cup 54 of the gripping means 20 might be replaced by electromagnets, gripper jaws or the like, the operation of which could be controlled in a manner similar to that described above for controlling vacuum application. Moreover, the support means 22 might comprise either alternative resilient elements such as metal bellows, or an articulated arrangement of links or the like.

It is our intention to cover these and any other changes or alterations which do not depart from the spirit and scope of the invention as herein claimed.

We claim:

1. Apparatus for acquiring individual workpieces from a supply of randomly oriented workpieces in a storage bin or the like comprising
a movable mounted head assembly and an abutment surface on said head assembly;
gripping means flexibly connected to said head assembly by support means;
operating means associated with said support means and said head assembly for moving said gripping means relative to said head assembly between an extended position spaced from the abutment surface and at which the flexibility of said support means permits said gripping means to movably adjust to a randomly oriented workpiece contacted thereby, and a retracted position in contact with said abutment surface at which both the gripping means and the workpiece gripped thereby are fixed relative to the head assembly,
said gripping means operating to grip a workpiece contacted thereby during movement of said head assembly; and,
sensing means responsive to a contact force exerted by said flexibly connected gripping means on a workpiece for generating a control signal.

2. The apparatus of claim 1 wherein said gripping means is comprised of a suction cup, and means for producing a vacuum within said cup when said cup is in contact with a workpiece.

3. The apparatus of claim 1 wherein said support means is comprised of a flexible element connected at one end to said gripping means and at the other end to said operating means.

4. The apparatus of claim 3 wherein said head assembly includes a cylinder, and wherein said operating means includes a piston reciprocally mounted within said cylinder, said flexible element being connected at said other end to said piston.

5. The apparatus as claimed in claim 4 wherein said gripping means is comprised of a suction cup, and first pneumatic means for producing a vacuum within said cup when said cup is in contact with a workpiece.

6. The apparatus as claimed in claim 5 wherein said first pneumatic means is activated by means responsive to said control signal.

7. The apparatus as claimed in claim 6 wherein said piston is reciprocated within said cylinder by second pneumatic means.

8. The apparatus as claimed in claim 7 wherein said second pneumatic means is activated by a control signal generated by a second sensing means responsive to the level of vacuum in said cup.

9. The apparatus of claim 5 wherein said first pneumatic means is connected to said suction cup by a flexible tube, and wherein said flexible element extends axially through said tube.

10. The apparatus of claim 9 wherein said flexible tube is contained within and reinforced by a coiled spring.

11. Apparatus as claimed in claim 1 wherein the operation of said gripping means is controlled in response to said control signal.

12. Apparatus as claimed in claims 1 or 11 wherein the movement of said head assembly is controlled in response to said control signal.

* * * * *